United States Patent [19]

Bugg

[11] Patent Number: 5,221,968
[45] Date of Patent: Jun. 22, 1993

[54] IDEOGRAPHIC TELETEXT TRANSMISSIONS

[75] Inventor: Richard E. F. Bugg, Sway, England

[73] Assignee: U.S. Philips Corp., New York, N.Y.

[21] Appl. No.: 720,568

[22] Filed: Jun. 25, 1991

[30] Foreign Application Priority Data

Jun. 27, 1990 [GB] United Kingdom ............... 9014256

[51] Int. Cl.$^5$ ............................................. H04N 7/08
[52] U.S. Cl. .................................................. 358/147
[58] Field of Search ..................... 358/142, 147, 146

[56] References Cited

FOREIGN PATENT DOCUMENTS 0231577 10/1987 Japan.
0013970 11/1990 PCT Int'l Appl..
2051527 5/1980 United Kingdom.

OTHER PUBLICATIONS

"World System Teletext and Data Broadcasting System, Technical Specification" (Levels 1 and 2).

Primary Examiner—James J. Groody
Assistant Examiner—David E. Harvey
Attorney, Agent, or Firm—David Schreiber

[57] ABSTRACT

An ideographic teletext transmission system based on the World System Teletext specification in which ideograms are displayed in the space of two character positions in each of three display rows, the ideogram code being defined by the corresponding bytes in one, e.g. the first, of the transmission packets corresponding to the three display rows and the corresponding bytes in another of the transmission packets corresponding to the three display rows being used to define an attribute code thereby affording a non-spacing attribute facility.

9 Claims, 2 Drawing Sheets

IDEOGRAPHIC TELETEXT TRANSMISSIONS

FIELD OF THE INVENTION

This invention relates to an ideographic teletext transmission system and more specifically to such a system which conforms to the World System Teletext specification. The invention also relates to a method and apparatus for such ideographic teletext transmissions.

BACKGROUND OF THE INVENTION

The specification for World System Teletext (WST) is set out in the document "World System Teletext and Data Broadcasting System"—Technical Specification, published December 1987 by the United Kingdom Department of Trade and Industry.

One of the major factors which distinguishes WST from other teletext systems is its direct mapping between transmission codes and display codes. Teletext data is transmitted in the form of transmission packets which comprise 40 data bytes. Each data packet corresponds to a row of a teletext display so that the 40 data bytes of each packet are directly mapped into 40 character or attribute positions on the corresponding display row. Typically, a teletext page is formed by 24 display rows, so 24 data packets are required to transmit each teletext page. This "Fixed Format" principle leads to simple and cheap decoders which are robust in the presence of reception errors. The Fixed Format principle is generally considered to be one of the main reasons why WST has been so successful, it being used presently in some 35 countries worldwide.

In WST a range of spacing attributes is specified as set out in FIG. 5 of the aforementioned WST Technical Specification and enables, for example, a color change to be introduced in a teletext display. A limitation of the WST Fixed Format principle is that such spacing attributes are transmitted in the same way that actual characters are transmitted and cause a blank space to be displayed wherever they occur in the display rows. It follows from this that the spacing attributes can only be placed in the natural space between words, otherwise they will cause an unwanted space to be inserted in the text. Usually this does not cause a problem but nevertheless it imposes a restriction which some editors might consider to be a problem since, for example, it is not possible in basic (level 1) WST to display every letter of a word in a different colour. Higher level versions of WST (level 2 and above) are provided with coding extensions which make non-spacing attributes possible, but the implementation of these coding extensions imply additional hardware and software in the decoder and require more time in which to transmit the additional codes.

In ideographic (e.g. Chinese) writing systems, each ideogram represents an idea or concept, and not a sound as is the case with Latin based systems, and consequently there are no spaces within a sentence where an attribute could be placed naturally. Higher level (level 2) coding extensions could be applied to ideographic teletext but this would involve an increase in cost for even the simplest ideographic decoder.

SUMMARY OF THE INVENTION

It is an object of the present invention to provide an ideographic teletext transmission which enables non-spacing attributes to be used without the need for coding extensions, thereby making it suitable for basic (level 1) WST.

According to one aspect of the present invention there is provided an ideographic teletext transmission system in which teletext data is transmitted in the form of a plurality of data packets each packet corresponding to a display row of a teletext data display of said system, each data packet comprising a plurality of data bytes, each data byte corresponding to a display position in the display row corresponding to the data packet, in which each ideogram of the ideographic teletext data to be transmitted by the system is displayed in the space of a plurality of adjacent display rows and in a plurality of adjacent display positions in each of the plurality of said adjacent display rows, characterized in that the data bytes corresponding to the plurality of adjacent display positions in the data packets corresponding to the plurality of the adjacent display rows are used in one data packet thereof to define an ideogram to be displayed and in another data packet thereof to define a display or control attribute or attributes.

In this way, because the ideogram to be displayed is displayed over a plurality of display rows, the data bytes used to define the display attribute are effectively obscured and the display attributes are effectively non-spacing.

Advantageously, each ideogram is displayed in the space of three of the display rows and in two corresponding display positions in each of the three display rows.

In a preferred embodiment, a system is provided in which the data bytes corresponding to the two display positions in the first one of the three data packets which correspond to the three display rows are used to define the ideogram to be displayed.

In carrying out the preferred embodiment, the data bytes corresponding to the two display positions in the second one of the three data packets which correspond to the three display rows are used to redefine the ideogram to be displayed, one or more of the data bytes corresponding to the two display positions in the third one of the three data packets which correspond to the three display rows being used to define the display attribute or attributes.

The data bytes corresponding to the plurality of adjacent display positions in the data packets corresponding to the plurality of the adjacent display rows may also be used in any remaining data packet or packets thereof to define a display attribute or attributes.

It should be noted that an ideographic teletext transmission system is disclosed in GB-A-2 051 527 in which non-spacing control information can be transmitted with certain ideogram codes. However with this previously proposed system the number of ideogram codes to which such control information can be applied is very limited whereas with the present invention control information or attributes can be transmitted with each of many thousands of ideograms for which codes are available.

According to another aspect of the present invention, there is provided a method of transmitting ideographic teletext data comprising the steps of transmitting data in the form of a plurality of data packets each corresponding to a display row of a teletext data display, each of the data packets comprising a plurality of data bytes, each data byte corresponding to a display position in the display row corresponding to the data packet, and displaying each ideogram of the ideographic teletext data in the space of a plurality of adjacent display rows and in a plurality of adjacent display positions in each of the plurality of adjacent display rows, characterized in that the data bytes corresponding to the plurality of adjacent display positions in the data packets corresponding to the plurality of the adjacent display rows are used in one data packet thereof to define an ideogram to be displayed and in another data packet thereof to define a display attribute or attributes.

According to a further aspect of the invention a teletext decoder for receiving teletext data transmitted in the form of a plurality of data packets with each packet corresponding to a display row of a teletext data display, each data packet comprising a plurality of data bytes with each data byte corresponding to a display position in the display row corresponding to the data packet, the decoder comprising means for decoding the teletext data and for applying the resulting decoded text information to a character generator, means for deriving display information from the character generator so that each ideogram of the decoded ideographic teletext data is displayed on the display in the space of a plurality of adjacent display rows and in a plurality of adjacent display positions in each of the plurality of the display rows, characterized in that the character generator interprets the data bytes corresponding to the plurality of adjacent display positions in the data packets corresponding to the plurality of the adjacent display rows in one data packet thereof to define an ideogram to be displayed and in another data packet thereof to define a display attribute or attributes.

BRIEF DESCRIPTION OF THE DRAWINGS

An exemplary embodiment of the invention will now be described reference being made to the accompanying drawings in which.

DESCRIPTION OF THE PREFERRED EMBODIMENT

As has been mentioned hereinbefore, the basis of WST is that teletext data is transmitted in the form of transmission packets each of which comprises 40 data bytes. Each data packet corresponds to a display row of a teletext display so that the 40 bytes of each packet are directly mapped into 40 character or attribute (space) positions on the corresponding display row.

When considering the Chinese writing system (or any other ideographic writing systems) there are two basic differences when compared to a Latin based alphabetic writing system. Firstly, there are many thousand possible ideograms so that the transmission code necessary to identify an ideogram must consist of two (8-bit) bytes, as opposed to one single byte normally used for alphabetic writing systems. Secondly, each ideogram represents an idea or concept, not a sound, so normally there are no spaces within a sentence where an attribute could naturally be placed.

It has been proposed that a Chinese ideogram be displayed on a teletext display screen in the space normally occupied by six alphabetic characters arranged in a three (vertical) by two (horizontal) configuration.

Figure 1:
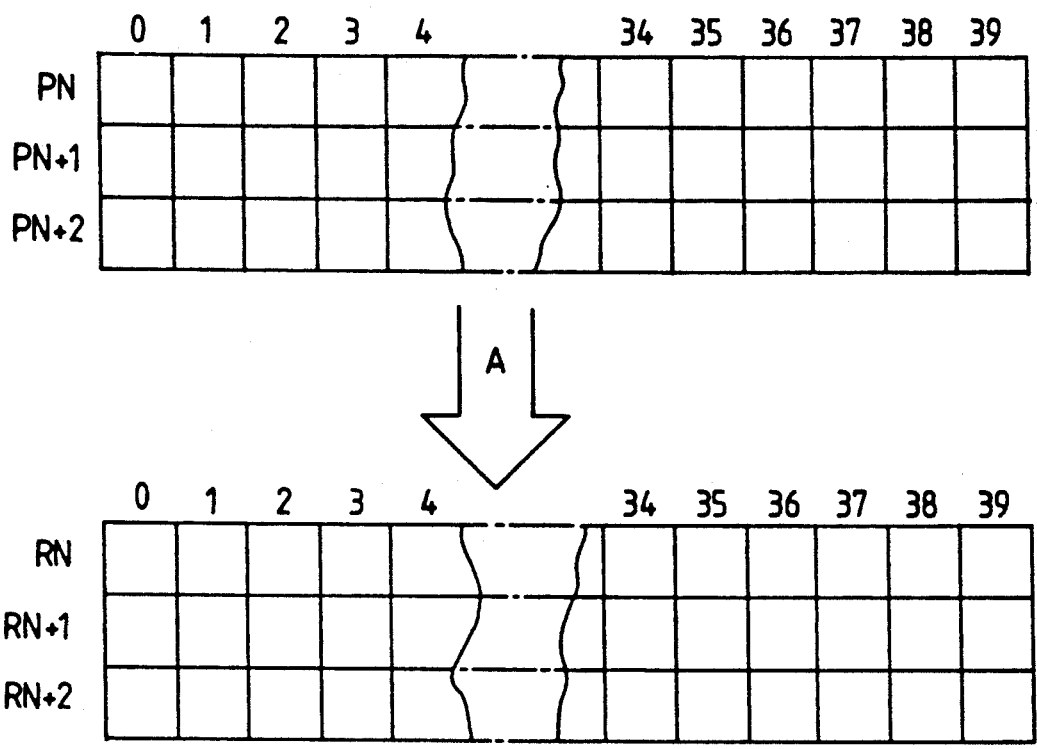
FIG. 1 diagrammatically depicts the relationship in the WST Fixed Format system between character bytes in data packets and characters in display rows, FIG. 2 diagrammatically depicts a modification of FIG. 1 for an ideographic teletext transmission system according to the present invention.

In FIG. 1 of the accompanying drawings there is shown diagrammatically three transmission packets PN, PN+1 and PN+2, each of 40 character bytes numbered 0 to 39. For normal alpha-numeric displays the three transmission packets PN, PN+1 and PN+2 are directly mapped, as indicated by the downwardly directed arrow A, into three display rows RN, RN+1 and RN+2 respectively, each of 40 display positions numbered 0 to 39.

Figure 2:
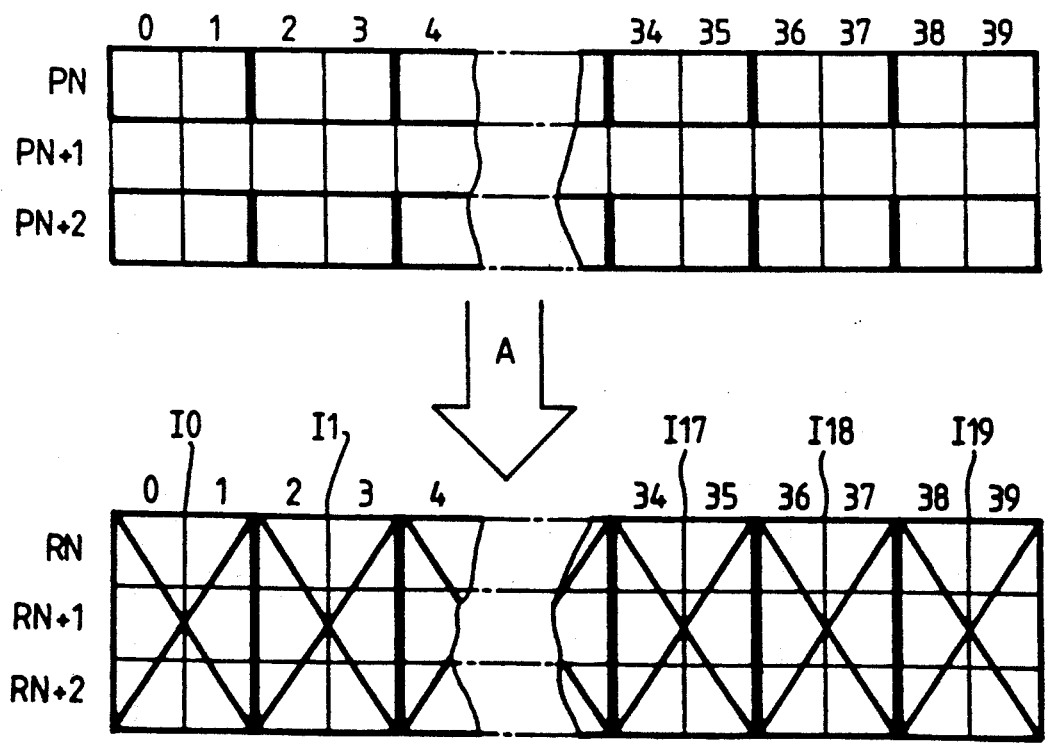

FIG. 2 shows that for ideographic text the display bytes 0 to 39 of the display rows RN, RN+1 and RN+2 are associated in pairs, 0,1; 2,3 . . . 38,39, and the corresponding pairs of display positions in the three successive display rows RN, RN+1 and RN+2 are used to display, for example, a Chinese ideogram I0, I1 . . . I19. Each of the ideograms I0, I1 . . . I19 is defined by the corresponding pair of bytes 0,1; 2,3 . . . 38,39 of the transmission packet PN and theoretically it is not necessary to transmit packets PN+1 and PN+2. However, the bytes in transmission packets PN+1 and PN+2 can usefully consist of a repeat of the data in packet PN. If, then, there is a reception error in packet PN, the correct data can be derived from packet PN+1 and/or packet PN+2. Sending a second repeat of the data in packet PN+2 is, however, unlikely to be very useful since if the data in packets PN and PN+1 is corrupted, it is likely that the reception conditions are so poor that the whole display page would be unusable.

Thus, instead of sending a second repeat of the data in packet PN, it is proposed that the bytes, optionally either individually or in pairs, in packet PN+2 be used to transmit an attribute code or codes which do not, therefore, require a space between the ideograms I1, I2 . . . I19, and which would enable, for example, successive ideograms to be represented in different display colors, without requiring spaces between the ideograms. The resulting obscured attribute codes may be either for display or control purposes and each code may either occupy the 16 bits of the two bytes or just 8 bits of one of the bytes. If the code only occupies one byte then the other byte may be a repeat or a dummy. Alternatively two such 8 bit attribute codes may occupy the two bytes. The or each attribute code may relate either to the ideogram resulting from the correspondingly numbered pair of bytes ("Set At") or to the ideogram resulting from the next pair of bytes ("Set After"). Thus an attribute code or codes conveyed in bytes 0, 1 of packet PN+2 may relate either to ideogram I0 or I1. Instead of repeating the data in packet PN in packet PN+2 this latter packet could also be used to transmit an attribute code or codes. To avoid confusion between attribute bytes, which always have a value below 20 Hex, the transmission bytes of transmission packet PN used to make up a two-byte ideogram code, always have a value equal to or above 20 Hex.

It is envisaged that both ideographic and normal sized alphabetic (Latin) text may be mixed on a single display page, in which case the attribute STL may be used to indicate, for example, when a Shift To Latin (STL) is required. The STL attribute may then be a normal spacing attribute or located in packet PN+2. In such a case each ideogram would again occupy six display positions whilst each normal alphabet character would occupy one display position.

Figure 3:
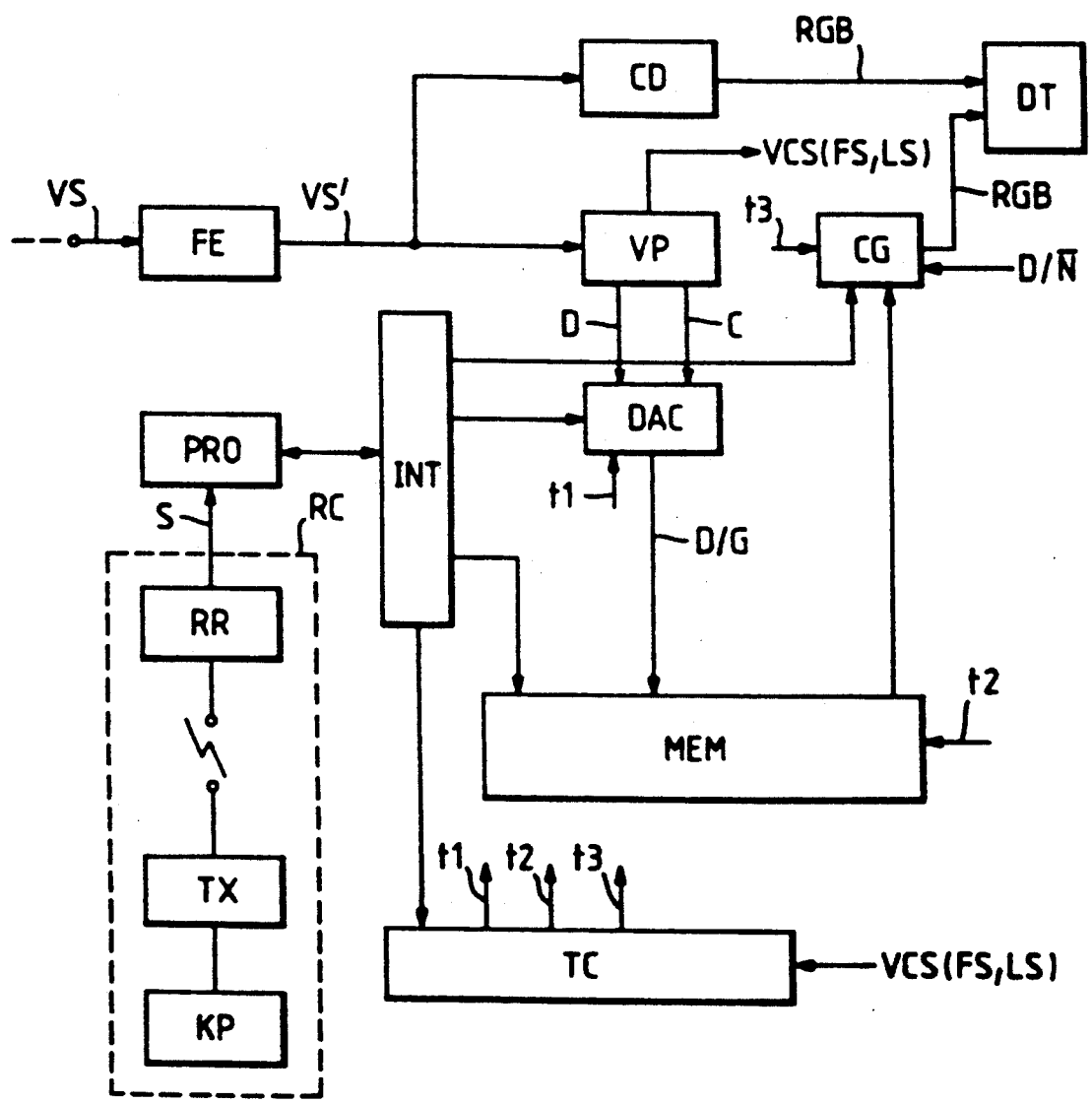
FIG. 3 is a block diagram of a teletext television receiver including a teletext decoder for use with the present invention.

A teletext television receiver for use with the present invention is shown in FIG. 3 and comprises video and data processing circuits for receiving and displaying both normal picture information and teletext information. The front end FE of the receiver comprises the usual amplifying, tuning and i.f. detector circuits, and is connected to receive an incoming television video signal VS. For normal picture display by the television receiver, the demodulated video signal VS' is applied to a color decoder which produces the R, G and B component signals for the picture display. Time base circuits for a display tube DT receive the usual line and field synchronizing pulses from a sync. separator circuit which extracts these synchronizing pulses from the video signal VS'. The element CD represents the color decoder and these other circuit elements which are provided for conventional picture display.

The demodulated video signal VS' is also applied to a teletext decoder section of the teletext television receiver which deals with the receipt and display of the alpha-numeric text, ideographic and other teletext information that is received in digitally coded form. This section comprises a video processor circuit VP which performs inter alia data slicing for retrieving teletext data pulses D from the video signal VS'. The video processor VP also produces input data clock pulses C from the data pulses D. The data pulses D are fed together with the clock pulses C to a data acquisition circuit DAC which is operabl to feed selected groups D/G of the teletext data pulses to a memo MEM as address and display information. The memory MEM has a capacity for storing at least one page of information, comprising a plurality of data rows. The page and row format laid down in the aforementioned publication "World System Teletext and Data Broadcast System" is assumed.

A logic processor PRO is operable in accordance with select signals S applied to it from a remote control arrangement RC to control which groups of teletext data pulses D/G are acquired by the data acquisition circuit DAC. The arrangement RC has a receiver part RR and a remote transmitter part comprising a transmitter TX and a keypad KP. The processor PRO is further operable to read out from the memory MEM display, information including both attribute and character information, for the selected page, for application to a character generator CG which is responsive to this display information to provide R, G, B component signals for the display. A timing circuit TC provides timing signals on connections t1 to t3 for the circuit elements DAC, MEM and CG. These circuit elements and the timing circuit TC are accessed by the processor PRO via an interface circuit INT. The operation of the timing circuit is synchronized with the received video signal VS by a composite pulse signal VCS which contains th line (LS) and field (FS) synchronising pulses which are separated from the demodulated video signal VS' in the video processor VP.

In the teletext television receiver shown in FIG. 3, only single line connections have been shown for the interconnections between the various circuit elements for the sake of simplicity. However, it will be apparent to a person skilled in the art that in practice most of these interconnections would be multi-line. For instance, whereas the teletext data pulses D retrieved from the video signal VS' would be applied serially to the data acquisition circuit DAC over a single connection, serial-to-parallel conversion would take place within this circuit DAC, so that the groups D/G teletext data pulse would be applied to the memory MEM in parallel over a multi-line connection. Also, the connection between the processor PRO and the interface circuit INT would be a multi-line bus, for instance, a so-called I$^2$C bus. Although a composite television receiver for receiving both normal picture information and teletext information is exemplified in FIG. 3, it will be appreciate that the teletext decoder section for data acquisition together with the front end FE may be provided as a separate teletext decoder which is adapted to feed either a CRT display monitor or a conventional television receiver.

The character generator CG contains means for interpreting the information applied to it to produce on the display tube DT the required ideographics and other text in the required colors. For displaying Chinese ideograms the character generator CG may interpret the incoming pairs of transmitted bytes in the manner shown in the Chinese 2-byte character set contained in FIG. 55 in the above noted WST specification. This character set does not contain attributes and a suitable table for two byte coded obscured display and control attributes could be readily produced based on the control characters for spacing attributes shown in FIG. 5 of the above WST specification. Such two byte codes in addition to defining the attribute could also define whether the attribute is "Set At" or "Set After". As an alternative each of the two bytes could each represent a separate attribute where that in the left hand byte (say position "0") could represent a control attribute. Both bytes could however represent different display or control attributes from different attribute sets. The attribute codes would also be interpreted by the character generator CG.

The character set contained in the above mentioned FIG. 55 of the WST specification includes two byte codes for capital and small letters of the Cyrilic, Greek and Latin alphabets though each such letter is displayed within the same space as occupied by an ideogram. If in addition to the ideograms it is desired to display text in, say, the Latin alphabet at the normal size, it will be necessary for the character generator CG to contain a normal sized Latin character set such as that shown in FIG. 3 of the above WST specification. The Control Bits C12, C13 and C14 in Packet X/O (see FIG. 1a in the above WST specification) are then used to show if the following page defaults to ideograms, or to Latin characters or to some other character set. If the default is to ideograms then the spacing attribute "Shift to Latin" (STL) will be transmitted so that appropriate rows or parts thereof will carry text in the Latin alphabet. A return to ideograms in such a row or rows will then be preceded by the spacing attribute STI—"Shift to Ideograms".

From reading the present disclosure, other modifications will be apparent to persons skilled in the art. Such modifications may involve other features which are already known per se and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

What is claimed is:

1. A method of transmitting an ideogram comprising the steps of transmitting said ideogram in the form of a plurality of data packets each corresponding to a a plurality of text display rows of a teletext data display, each of the data packets comprising a plurality of data bytes, each data byte corresponding to a text display position in each text display row corresponding to said data packet, and displaying each ideogram in the display space of a plurality of adjacent text display rows and in a plurality of adjacent text display positions in each of said plurality of adjacent text display rows, and causing the data bytes corresponding to said plurality of adjacent text display positions in the data packets corresponding to said plurality of said adjacent text display rows in one data packet thereof to define an ideogram to be displayed and in another data packet thereof to define at least one display attribute.

2. A teletext decoder for receiving ideographic teletext data transmitted in the form of a plurality of data packets with each data packet corresponding to a plurality of text display rows of a teletext data display, each data packet comprising a plurality of data bytes with each data byte corresponding to a text display position in each text display row corresponding to said data packet, said decoder comprising means for decoding said teletext data and for applying the resulting decoded text information to a character generator, means for deriving display information from said character generator so that each ideogram of the decoded ideographic teletext data is displayed on said display in the space of a plurality of adjacent text display rows and in a plurality of adjacent text display positions in each of said plurality of said adjacent text display rows, said character generator including means for interpreting the data bytes corresponding to said plurality of adjacent text display positions in the data packets corresponding to said plurality of said adjacent text display rows in one data packet thereof to define an ideogram to be displayed and in another data packet thereof to define at least one display attribute.

3. An ideographic teletext transmission system comprising means for transmitting an ideogram to a text display, the text display including a plurality of text display rows, each text display row including a plurality of text display positions, the ideogram including a plurality of data packets, at least one data packet corresponding to a plurality of adjacent text display rows, each data packet including a plurality of data bytes, each data byte corresponding to a text display position in the text display row, display means for displaying the ideogram defined by one data packet in a display space defined by the plurality of adjacent text display rows and a plurality of adjacent text display positions, and means for defining at least one display attribute in another data packet thereof.

4. A system as claimed in claim 3, wherein the display means displays the ideogram in the display space of three adjacent text display rows and two adjacent text display positions.

5. A system as claimed in claim 4 wherein the data bytes corresponding to said plurality of adjacent text display positions in each data packets corresponding to said plurality of said adjacent text display rows in any remaining data packet or packets thereof define at least one display attribute.

6. A system as claimed in claim 4, wherein the ideogram is defined the by two adjacent data bytes in one of three data packets and wherein the display means displays the ideogram in the display space defined by three adjacent text display rows and two adjacent display positions in each display row.

7. A system as claimed in claim 6, wherein the ideogram is defined by two adjacent data bytes in a second of three data packets and wherein at least one of the data bytes in the third of three data packet includes a display attribute.

8. A system as claimed in claim 6 wherein the data bytes corresponding to said plurality of adjacent text display positions in each data packet corresponding to said plurality of said adjacent text display rows in any remaining data packet or packets thereof define at least one display attribute.

9. A system as claimed in claim 3 wherein the data bytes corresponding to said plurality of adjacent text display positions in each data packet corresponding to said plurality of said adjacent text display rows in any remaining data packet or packets thereof define at least one display attribute.

* * * * *